US00RE38847E

(19) United States
(12) Reissued Patent
Nonoda et al.

(10) Patent Number: US RE38,847 E
(45) Date of Reissued Patent: Oct. 25, 2005

(54) REFLECTED FLUORESCENCE MICROSCOPE WITH MULTIPLE LASER AND EXCITATION LIGHT SOURCES

(75) Inventors: Yukio Nonoda, Ina (JP); Yasushi Aono, Yokohama (JP); Katsuyuki Abe, Hachioji (JP)

(73) Assignee: Olympus Optical Co., Ltd., Tokyo (JP)

(21) Appl. No.: 10/170,874

(22) Filed: Jun. 13, 2002

Related U.S. Patent Documents

Reissue of:
(64) Patent No.: 6,075,643
Issued: Jun. 13, 2000
Appl. No.: 09/175,913
Filed: Oct. 20, 1998

(30) Foreign Application Priority Data

Oct. 24, 1997 (JP) ..... 9-292446

(51) Int. Cl.[7] ..... G02B 21/06
(52) U.S. Cl. ..... 359/385; 359/372; 359/388; 359/389
(58) Field of Search ..... 359/371, 372, 359/381, 382, 384–390

(56) References Cited

U.S. PATENT DOCUMENTS 3,798,435 A * 3/1974 Schindl ..... 359/388
4,023,905 A * 5/1977 Chance ..... 356/97
5,239,171 A * 8/1993 Takabayashi ..... 250/205
5,371,624 A * 12/1994 Nagano ..... 359/389
5,535,052 A * 7/1996 Jorgens ..... 359/388
5,548,441 A * 8/1996 Greenberg ..... 359/390
5,825,533 A * 10/1998 Yonezawa ..... 359/372
5,880,880 A * 3/1999 Anderson ..... 359/385
6,337,474 B1 * 1/2002 Morizono ..... 250/208.1
6,388,807 B1 * 5/2002 Knebel ..... 359/368

FOREIGN PATENT DOCUMENTS

JP 06-160724 * 6/1994
JP 8-234110 * 9/1996

* cited by examiner

*Primary Examiner*—Leo Boutsikaris
(74) *Attorney, Agent, or Firm*—Frishauf, Holtz, Goodman & Chick, P.C.

(57) ABSTRACT

Caged reagent release experiments are carried out by introducing laser light of a laser light source for the Caged reagent release of a first reflected illumination optical system light path into a sample side through a first dichroic mirror on a cube turret and also introducing excitation light of a mercury lamp for the excitation light irradiation of a third reflected illumination optical system light path into the sample side through a first dichroic mirror on a slider. Laser trap experiments are carried out by introducing excitation light of a mercury lamp for the excitation light irradiation of a second reflected illumination optical system light path into the sample side through a second dichroic mirror on the cube turrent and also introducing laser light from the laser light source for the laser trap of the third reflected illumination optical system light path into the sample side through a second dichroic mirror on the slider.

34 Claims, 10 Drawing Sheets

REFLECTED FLUORESCENCE MICROSCOPE WITH MULTIPLE LASER AND EXCITATION LIGHT SOURCES

Matter enclosed in heavy brackets [ ] appears in the original patent but forms no part of this reissue specification; matter printed in italics indicates the additions made by reissue.

BACKGROUND OF THE INVENTION

The present invention relates to a reflected fluorescence microscope, and more particularly to a reflected fluorescence microscope employing the laser trap method or the Caged reagent release method used as a means for cellular operation in the cell physiological field.

The reflected fluorescence observation using a reflected fluorescence microscope is now a method widely and generally employed as a method of morphologic observation of specific substances inside cells in the biological field.

Recently, the laser trap method or the Caged reagent release method has been widely employed as an operating intracellular substances operating method using a reflected illumination means of a microscope, particularly, in the cell physiological field.

The laser trap method (light pin set method), which is a method of applying laser light to an arbitrary substance in a sample and optically capturing the substance, is employed as a means for measuring energy when protein in cells moves. Infrared laser light is used for the applying means. On the other hand, the Caged reagent release method is a method of bonding a Caged reagent with molecules having physiological activity, administrating it into cells in a state where activity is restricted, and releasing the bonding by applying light thereto so as to recover the activity of the cells. Ultraviolet light is used for the applying means.

As described above, a reflected fluorescence microscope employing the laser trap method or the Caged reagent release method needs various light sources for cellular operation other than the general reflected fluorescence illumination.

In a conventionally used general reflected fluorescence microscope, as shown in FIG. 1, an excitation light source 104 for fluorescence observation is provided for a first dichroic mirror DM1 provided together with a barrier filter BA in an observation optical system light path 103 connecting an object lens 101 and an eyepiece 102, a second dichroic mirror DM2 is provided between the first dichroic mirror DM1 and the excitation light source 104, a band pass filter BP is provided between the second dichroic mirror DM2 and the excitation light source 104, and a light source 105 for sample operation is provided in a light path which is orthogonal at the second dichroic mirror DM2.

Further, Jpu. Pat. Appln. KOKAI Publication No. 8-234110 discloses a reflected fluorescence microscope, as shown in FIG. 2, wherein a first dichroic mirror DM1 for introducing excitation light from an excitation light source 108 for fluorescence observation into an observation optical system light path 107, and a second dichroic mirror DM2 for introducing laser light of the laser trap from a laser light source 109 thereto are provided at two stages.

In the prior art shown in FIG. 1, however, not only the band pass filter BP, but also the first dichroic mirror DM1 need to be exchanged if executing the fluorescence observation by switching the excitation wavelength of the excitation light source 104 is considered. At this time, the first dichroic mirror DM1 and the band pass filter BP, which are provided separately from one another, must be exchanged separately, and the work for this exchange is complicated and troublesome.

On the other hand, in the prior art in FIG. 2 disclosed in Jpn. Pat. Appln. KOKAI Publication No. 8-234110, in a case where the first dichroic mirror DM1 is provided more closely to the sample side than the second dichroic mirror DM2, if, for example, the laser wavelength range of the laser light source 109 is changed to the ultraviolet range, which is to be used for the Caged reagent release, the first dichroic mirror DM1 and the barrier filter BA must have a characteristic of transmitting the last wavelength from the laser light source 109 in order to certainly introduce the laser light reflected at the second dichroic mirror DM2 into the sample side. At every introduction of the laser light, a troublesome work such as exchange of the first dichroic mirror DM1 and the barrier filter BA to optimal ones need to be carried out and, therefore, there is little realizability of this system Actually, the laser light source 109 cannot be applied to the object of use in the range other than the infrared range for the laser trap and can be hardly used for a general purpose Further, since the second dichroic mirror DM2 is fixed in the observation optical system light path 107, no problems occur in a general fluorescence observation, but the fixation is a reason for loss of light amount in the tiny fluorescence observation such as measurement of light at the one-molecule level and is not therefore preferable.

BRIEF SUMMARY OF THE INVENTION

Accordingly, it is an object of the present invention to provide a reflected fluorescence microscope having a plurality of light paths in the reflected illumination optical system, which are not limited respectively in use, and being largely usable for a general purpose.

According to one aspect of the present invention, there is provided a reflected fluorescence microscope for allowing a plurality of reflected illumination light beams to be selectively irradiated onto a sample, to carry out optical operations of the sample and its fluorescence observation simultaneously, the microscope comprising: a first reflected illumination optical system light path provided in a direction which crosses an observation optical system light path to the sample at a point of intersection; a second reflected illumination optical system light path provided in a direction which crosses the observation optical system light path at the same point of intersection as that between the observation optical system light path and the first reflected illumination optical system light path; and a third reflected illumination optical system light path provided in a direction which crosses the observation optical system light path at a different point of intersection from that of the first or second reflected illumination optical system light path.

The microscope may further comprise wavelength discriminating means provided to be inserted or detached at the point of intersection between the observation optical system light path and the third reflected illumination optical system light path.

The microscope may further comprise a fourth reflected illumination optical system light path provided in a direction which crosses the observation optical system light path at a different point of intersection from that of the first, second or third reflected illumination optical system light path.

According to another aspect of the present invention, there is provided a reflected fluorescence microscope for allowing a plurality of reflected illumination light beams to be selectively irradiated onto a sample, to carry out optical operations of the sample and its fluorescence observation simultaneously, the microscope comprising: a first reflected illumination optical system light path provided in a direction which crosses an observation optical system light path to the sample at a point of intersection; a second reflected illumination optical system light path provided in a direction which crosses the observation optical system light path at the same point of intersection as that between the observation optical system light path and the first reflected illumination optical system light path; a first movable member having a cube including a first dichroic mirror and a cube including a second dichroic mirror, for providing a desired one of the cubes to be inserted or detached at the point of intersection between the observation optical system light path and the first or second reflected illumination optical system light path; a third reflected illumination optical system light path provided in a direction which crosses the observation system light path at a different point of intersection from that between the first or second reflected illumination optical system light path; and a second movable member having a cube including a third dichroic mirror, for providing the cube to be inserted or detected at the point of intersection between the observation optical system light path.

In the microscope, the first dichroic mirror may reflect the light from the first reflected illumination optical system light path to a side of the sample, while transmitting fluorescence emitted from the sample. The second dichroic mirror may reflect the light from the second reflected illumination optical system light path to a side of the sample, while transmitting fluorescence emitted from the sample. The third dichroic mirror may reflect the light from the third reflected illumination optical system light path to a side of the sample, while transmitting fluorescence emitted from the sample.

In the microscope, the first movable member may be a cube turret. The second movable member may be a slider.

The microscope may further comprise a laser light source for forming the first reflected illumination optical system light path. The microscope may further comprise a mercury light source for forming the second reflected illumination optical system light path. The microscope may further comprise at least one of a laser light source and a mercury light source for forming the third reflected illumination optical system light path.

The microscope may further comprise a fourth reflected illumination optical system light path provided in a direction which crosses the third reflected illumination optical system light path at a point of intersection. In this case, the microscope may further comprise a slider for providing a total reflection mirror to be inserted or detached at a point of intersection between the third and fourth reflected illumination optical system light paths.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above the detailed description of the preferred embodiments given below, serve to explain the principles of the invention.

DETAILED DESCRIPTION OF THE INVENTION

Embodiments of the present invention will be described below with reference to the drawings.

1st Embodiment

Figure 1:
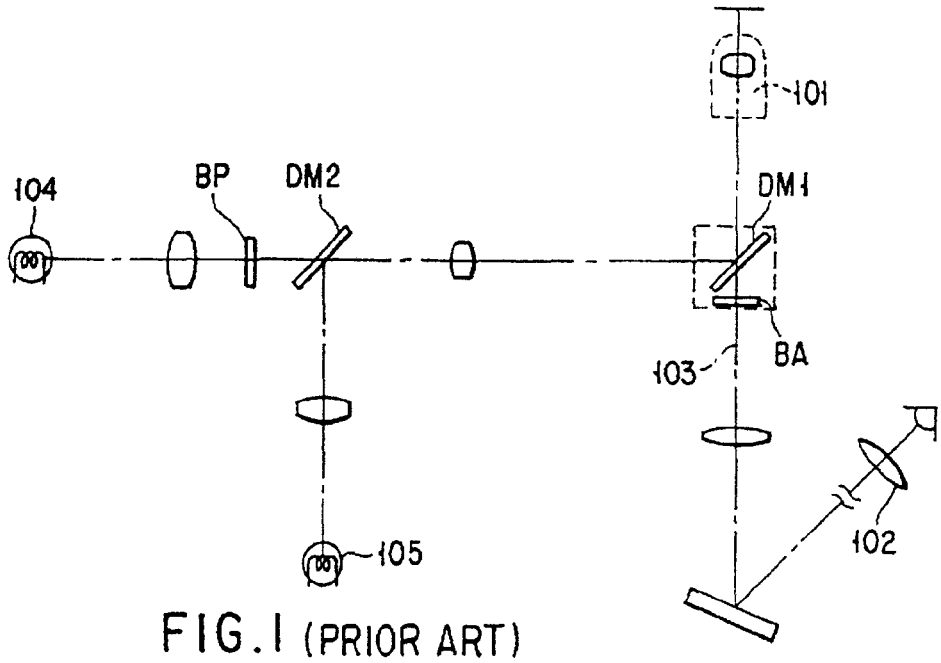
FIG. 1 (PRIOR ART)
FIG. 1 is a diagram illustrating a schematic structure of an example of a conventional reflected fluorescence microscope.
Figure 2:
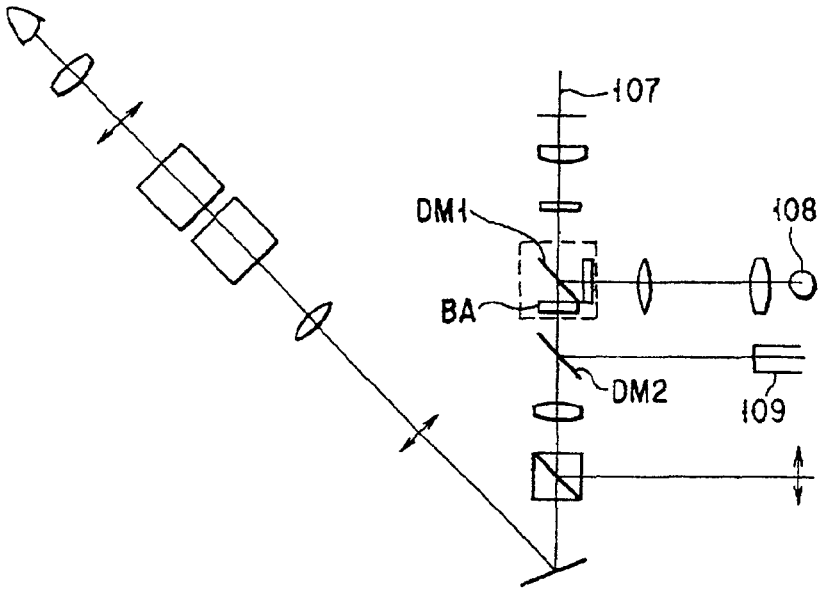
FIG. 2 (PRIOR ART)
FIG. 2 is a diagram illustrating a schematic structure of another example of a conventional reflected fluorescence microscope.
Figure 3:
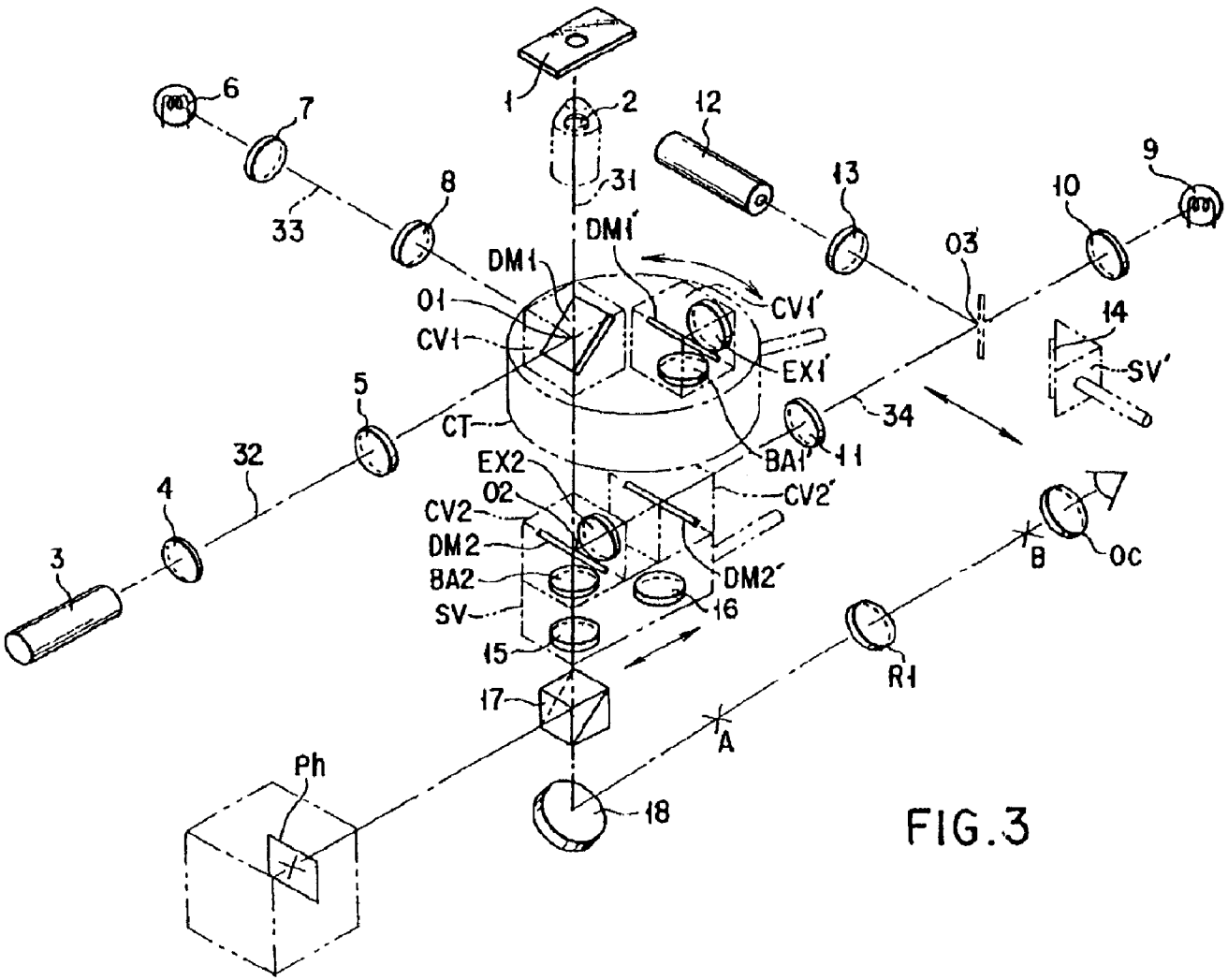
FIG. 3 is a diagram illustrating a schematic structure of a first embodiment of the present invention.
Figure 4:
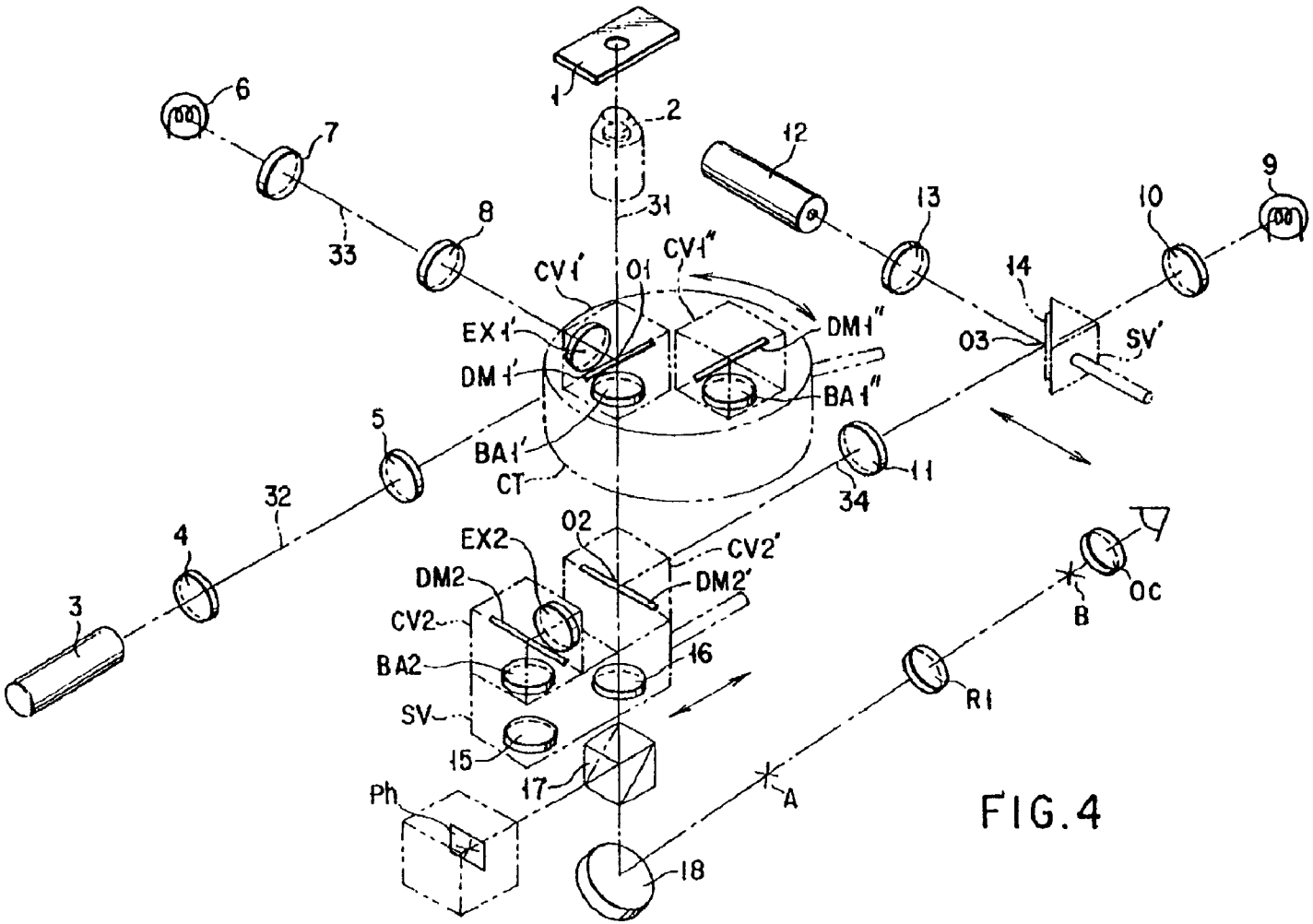
FIG. 4 is a diagram illustrating the schematic structure of the first embodiment of the present invention in a different mode of operation than the one in FIG. 3.

FIGS. 3 and 4 illustrate a schematic structure of an inverted-type reflected fluorescence microscope to which the present invention is applied. In the figures, reference numeral 1 denotes a sample. An object lens 2 is provided under the sample 1, and a cube turret CT as represented in a broken line is provided in an optical axis 31 of the observation optical system light path passing through the object lens 2.

The cube turret CT includes a cube CV1 which has a dichroic mirror DM1 with an inclination angle of 45 degrees to the optical axis 31, and a cube CV1' which has a dichroic mirror DM1' with an inclination angle of 45 degrees to the optical axis 31, a barrier filter BA1' and an excitation filter EX1' The cube turret CT allows the cube CV1 or CV1' to be selectively positioned at a point O1 which the optical axis 31 passes, by rotating around a rotary axis (not shown) in a plane perpendicular to the optical axis 31.

The cube turret CT shown in FIG. 3 includes only two cubes. However, at least four cubes having the same structure and shape as those of the cubes CV1 and CV1' can be inserted or detached, and reflective surface of a dichroic mirror of an arbitrary cube can be positioned at the point O1 at which the optical axis 31 passes, by the rotation of the turret and a positioning mechanism (not shown). For example, FIG. 4 illustrates an example in which a cube CV1" having a dichroic mirror DM1" and a barrier filter BA1" is included in the cube turret CT, and the cube turret CT is constituted to be applicable to a case where the wavelengths of a laser light source 3 and a mercury light source 6 described later are varied. The cube CV1' holds the dichroic mirror DM1' so that the reflective surface of the dichroic mirror DM1' faces the mercury light source 6 described later when the optical axis 31 passes through the cube CVI'.

A relay lens 5, a collector lens 4 and a laser light source 3 are provided in a common straight line, in an optical axis 32 of a first reflected illumination optical system light path which extends from the point O1 of he cube turret CT, perpendicularly to the optical axis 31. In addition, a relay lens 8, a collector lens 7 and a mercury light source 6 are provided in a common straight line, in an optical axis 33 of a second reflected illumination optical system light path which extends from the point O1, perpendicularly to both the optical axis 31 and the direction extending from the point O1 to the laser light source 3.

A slider SV represented in a broken line, which is described later, is provided to be movable along an optical axis 34 under the cube turret CT.

On the slider SV, a cube CV2 including a dichroic mirror DM2 having an angle of inclination at 45 degrees to the optical axis 32, a barrier filter BA2 and an excitation filter EX2, an a cube CV2' including a dichroic mirror DM2' provided parallel to the dichroic mirror DM2, are aligned in a direction in which the optical axis 32 is reflected by the dichroic mirror DM2 (or in the direction of the optical axis 34). The cubes CV2 and CV2' can be inserted into or detached from the slider SV. A condense lens 15 is provided just under the cube CV2 of the slider SV, and a condense lens 16 is provided just under the cube CV2'.

The slider SV moves along the direction of the optical axis 34, so that the reflective surface of the dichroic mirror DM2 of the cube CV2 or the reflective surface of the dichroic mirror DM2'of the cube CV2' can be selectively positioned at the point O2 at which the optical axis 31 passes.

The switch stopping position of the dichoric mirrors DM2 and DM2' on the slider SV is set by a positioning mechanism (not shown)

A relay lens 11, a collector lens 10 and a mercury light source 9 are provided in the optical axis 34 of a third reflected illumination optical system light path reflected from the point O2 of the slider SV. A slider SV' is provided to be inserted or detached, at a point O3 at which the optical axis 34 passes, in the optical axis 34 extending between the relay lens 11 and the collector lens 10, and a collector lens 13 and a laser light source 12 are provided perpendicularly to the optical axis 34 via the slider SV'.

In this case, a total reflection mirror 14 is provided on the slider SV'. By moving the slider SV' in a direction represented by an arrow in the figure, the refelective surface of the total reflection mirror 14 can be inserted or detached at the point O3 and a luminous flux from the laser light source 12 can be introduced toward the point O2 from which the optical axis 31 extends. The inserted and detached position of the slider SV' is automatically set by a positioning mechanism (not shown).

On the other hand, a half prism 17 for splitting a light path and a total reflection mirror 18 for introducing the optical axis 31 into an eyepiece section are provided, in the optical axis 31, under the slider SV.

The observation light transmitted through the condense lens 15 or 16 is split into two beams by the beam splitter 17. The light beam reflected by the beam splitter 17 is introduced into a photographing light path and forms an image on a light receiving surface Ph of a photographing device or a TV camera.

The light beam transmitted through the beams spitter 17 is reflected by the total reflection mirror 18 and introduced into an observation light path. After an image is formed at an intermediate imaging point A in the observation light path, it is relayted by a relay lens R1 and formed again at a point B This image is observed through an eyepiece Oc.

Next, operations of the embodiment thus constituted will be explained.

It is assumed here that an $N_2$ laser having a wavelength of 337 nm for the Caged reagent release is used as the laser light source 3, mercury light to take out the light having a wavelength of 488 nm for the fluorescent observation, for irradiation of the excitation light, is used as the mercury light source 6, mercury light to take out the light having a wavelength of 532 nm for the flourescent observation, for irradiation of the excitation light, is used as the mercury light source 9, and an IR laser having a wavelength of 1064 nm for the laser trap is used as the laser light source 12.

As shown in FIG. 3, first, the cube CV1 of the cube turret CT is positioned in the optical axis 31 and the cube CV2 of the slider SV is inserted into the optical axis 31 of the observation optical system light path. Then the slider SV' is removed from the optical axis 34.

Figure 5:
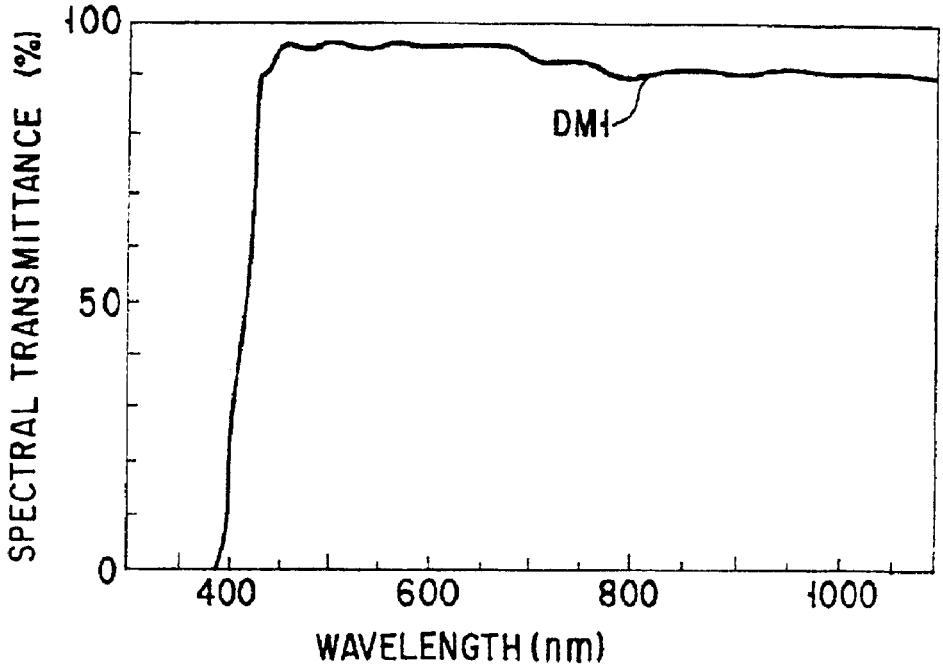
FIG. 5 is a graph showing spectral transmittance characteristics of a dichroic mirror DM1 used in the first embodiment of the present invention.

In this state, the $N_2$ laser for the Caged reagent release having a wavelength of 337 nm from the laser light source 3 is made incident on the dichroic mirror DM1 of the cube CV1 via the collector lens 4 and relay lens 5. If the dichroic mirror DM1 having the spectral transmittance characteristics of reflecting the light having a wavelength of less than 400 nm and transmitting the light having a wavelength exceeding 400 nm as shown in FIG. 5, is used, the $N_2$ laser of the laser light source 3 is reflected at the dichroic mirror DM1 and irradiated at a predetermined position in the observation visual view of the sample 1 through the object lens 2 so as to carry out the Caged reagent release.

Figure 6:
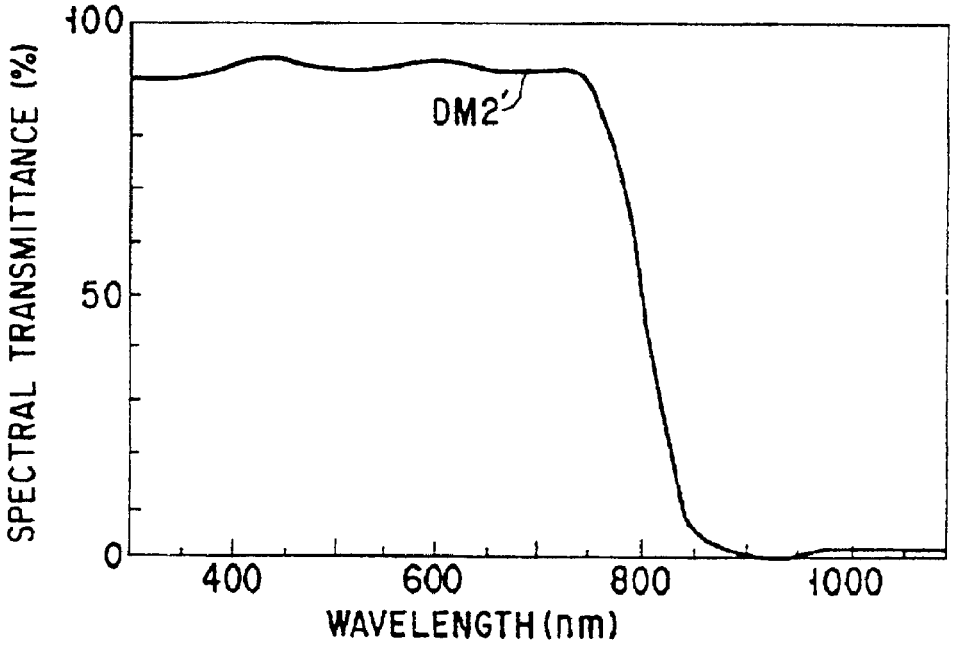
FIG. 6 is a graph showing spectral transmittance characteristics of a dichroic mirror DM2' used in the first embodiment of the present invention.
Figure 7:
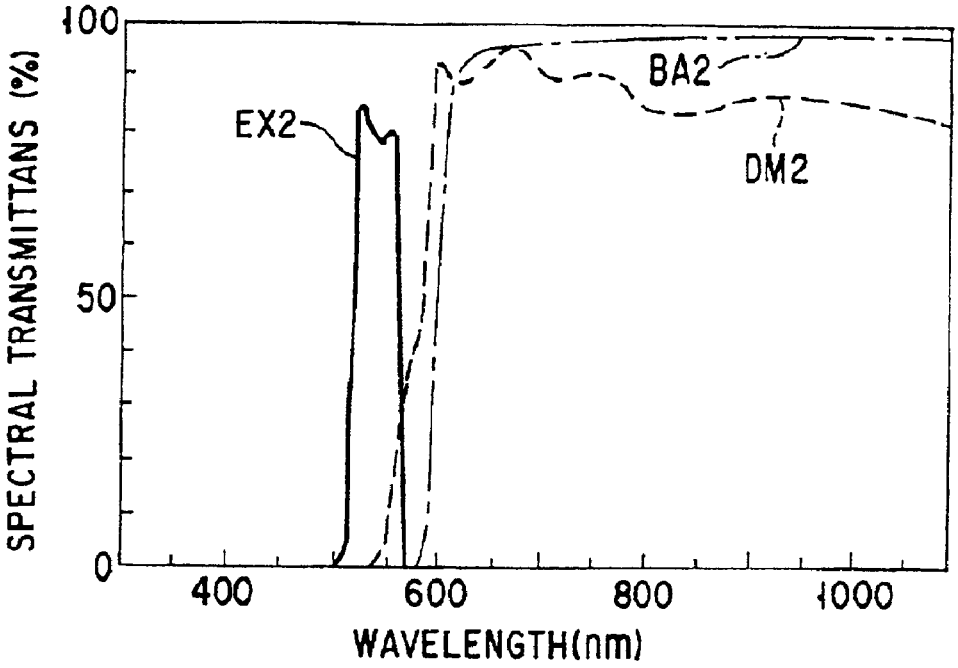
FIG. 7 is a graph showing spectral transmittance characteristics of a dichroic mirror DM2, an exactuation filter EX2, and a barrier filter BA2 used in the first embodiment of the present invention.

On the other hand, in this state, the dichroic mirror DM2 of the cube CV2 of the slider SV is positioned at the point O2 at which the optical axis 31 passes, and the slider SV' is detached from the optical axis 34. Therefore, the mercury light of the mercury light source 9 having a wavelength of 532 nm is made incident on the dichroic mirror DM2' via the collector lens 10 and the relay lens 11. If the dichroic mirror DM2' having the spectral transmittance characteristics of transmitting the light having a wavelength of less than 800 nm and reflecting the light having a wavelength exceeding 800 nm as shown in FIG. 6, is used here, the light from the mercury light source 9 is transmitted through the dichroic mirror DM2' and made incident on the excitation filter EX2 of the cube CV2. Further, if the excitation filter EX2 having the spectral transmittance characteristics of transmitting the light having an excitation light wavelength ranging from 510 nm to 550 nm as shown in FIG. 7, is used, only the excitation light is transmitted and made incident on the dichroic mirror DM2. Moreover, if the dichroic mirror DM2 having the spectral transmittance characteristics of reflecting the light having a wavelength of less than 570 nm and transmitting the light having a wavelength exceeding 570 nm as shown in FIG. 7, is used, the excitation light from the excitation filter EX2 is reflected upward at the dichroic mirror DM2, transmitted through the dichroic mirror DM1 and irradiated in the observation visual view of the sample 1 through the object lens 2.

When fluorescence is emitted from the sample 1 by irradiation of the excitation light, the fluorescence is made incident on the barrier filter BA2 of the cube CV2 through the dichroic mirrors DM1 and DM2 after passing through the object lens 2. If the barrier filter BA2 having the spectral transmittance characteristics of reflecting the light having a wavelength of less than 590 nm and transmitting the light having a wavelength exceeding 590 nm as shown in FIG. 7, is used here, the fluorescence is transmitted and then observed through the half prism 17 and the total reflection mirror 18.

The Caged reagent release and the fluorescence observation can be carried out simultaneously.

The characteristics of the dichroic mirrors DM1 and DM2 used when the Caged reagent release and the fluorescence observation are carried out simultaneously will be summarized as follows.

That is, the dichroic mirror DM1 reflects the laser light from the laser light source 3 (having a wavelength of less than 400 nm), and transmits the excitation light from the mercury light source 9 and the light (having a wavelength exceeding 400 nm) emitted from the sample 1 (see FIG. 5). The dichroic mirror DM2 reflects the excitation light from the mercury light source 9 (having a wavelength of less than 570 nm), and transmits the light (having a wavelength exceeding 570 nm) emitted from the sample 1 (see FIG. 7).

Next, as shown in FIG. 4, the cube turret CT is rotated in a direction represented by an arrow to position the cube CV1' in the optical axis 31, the cube CV2' is inserted into the optical axis 31 by switching the slider SV, and the total reflection mirror 14 is inserted into the optical axis 34 by switching the slider SV'.

Figure 8:
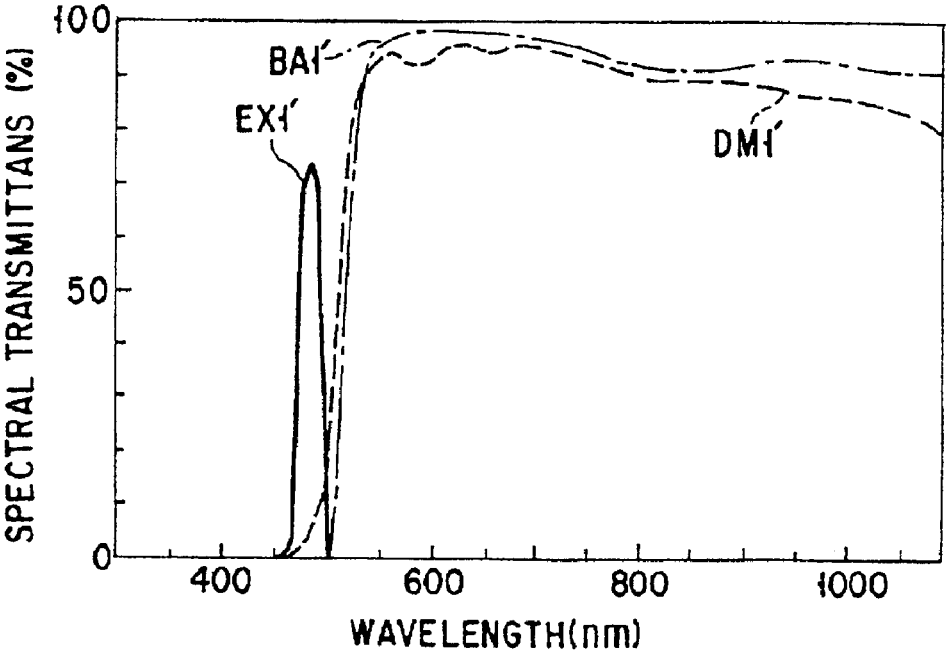
FIG. 8 is a graph showing spectral transmittance characteristics of a dichroic mirror DM1', and excitation filter EX1', and a barrier filter BA1' used in the first embodiment of the present invention.

In this state, the mercury light for observation of the fluorescence having a wavelength of 488 nm, from the mercury light source 6, is made incident on the excitation filter EX1' of the cube CV1' through the collector lens 7 and the relay lens 8. If the excitation filter EX1' having the spectral transmittance characteristics of transmitting the light having a wavelength ranging from 470 nm to 490 nm as shown in FIG. 8, is used here, only the excitation light is made incident on the dichroic mirror DM1'. Further, if the dichroic mirror DM1' having the spectral transmittance characteristics of reflecting the light having a wavelength of less than 500 nm and transmitting the light having a wavelength exceeding 500 nm as shown in FIG. 8, is used here, the excitation light of the excitation filter EX1' is reflected upward at the dichroic mirror DM1' and irradiated into the observation visual field of the sample 1 through the object lens 2.

When the fluorescence is emitted from the sample 1 by irradiation of the excitation light, this fluorescence is transmitted through the dichroic mirror DM1' after passing through the object lens 2, and is made incident on the barrier filter BA1' of the cube CV1'. If the barrier filter BA1' having the spectral transmittance characteristics of reflecting the light having a wavelength of less than 515 nm and transmitting the light having a wavelength exceeding 515 nm as shown in FIG. 8, is used here, the fluorescence is transmitted and is made incident on the dichroic mirror DM2' of the slide SV. Since the wavelength of the fluorescence at this time is less than 800 nm, the fluorescence is transmitted through the dichroic mirror DM2' and observed through the half prism 17 and the total reflection mirror 18.

On the other hand, since the slider SV' is inserted into the optical axis 34, the IR laser for the laser trap having a wavelength of 1064 nm from the laser light source 12 is made incident on the total reflection mirror 14 after passing through the collector lens 13 to be totally reflected at the total reflection mirror 14, and is made incident on the dichroic mirror DM2' of the cube CV2'. Then, the laser beam is reflected upward by the spectral transmittance characteristics of the dichroic mirror DM2' and is made incident on the barrier filter BA1' of the cube CV1'. The laser beam is transmitted by the spectral transmittance characteristics of the barrier filter BA1', further transmitted by the spectral transmittance characteristics of the dichroic mirror DM1', and made incident on the object lens 2.

The laser light beam incident on the object lens 2 is collected, and irradiated to a predetermined position on the sample 1 as a laser spot. Fine substances in the sample 1 can be optically captured near the irradiated laser collection point.

By these operations, capture of the fine substances, measurement of a tiny force, etc. can be simultaneously carried out by the observation of fluorescence and the laser trap.

The characteristics of the dichroic mirrors DM1' and DM2' used when the capture of fine substances, measurement of a tiny force, etc. based on the observation of fluorescence and the laser trap are carried out, can be summarized as follows.

That is, the dichoric mirror DM1' reflecting the excitation light (having a wavelength of less than 500 nm) from the mercury light source 6 bans also transmitting the laser light transmitted from the laser light source 12 and the light (having a wavelength exceeding 500 nm) emitted from the sample 1, is used (see FIG. 8). In addition, the dichroic mirror DM2' reflecting the laser light (having a wavelength of more than 800 nm) from the laser source 12 and transmitting the light (having a wavelength less than 800 nm) emitting from the sample 1, is used (see FIG. 6).

With this structure, the experiments of the Caged reagent release experiment based on the Caged reagent release and the observation of the fluorescence can be carried out, by introducing the laser light from the laser light source 3 for the Caged reagent release of the first reflected illumination optical system light path into the sample 1 side through the dichroic mirror DM1 of the cube CV1, and simultaneously introducing the excitation light from the mercury lamp 9 for irradiation of the excitation light of the third reflected illumination optical system light path into the sample 1 side through the dichroic mirror DM2' of the cube CV2' and dichroic mirror DM2 of the cube CV2. On the other hand, the laser trap experiments such as capture fine substances, measurement of a tiny force, etc. based on observation of the fluorescence and the laser trap can be selectively carried out, by introducing the excitation light from the mercury lamp 6 for excitation light irradiation of the second reflected illumination optical system light path to the sample 1 side through the dichroic mirror DM1' of the cube CV1', and simultaneously introducing the laser light from the laser light source 12 for the laser trap of the third reflected illumination optical system light path to the sample 1 side through the dichroic mirror DM2' of the cube CV2'. That is, these two experiments can be selectively carried out together with the sample operation, and a reflected fluorescence microscope usable for a general purpose can be provided.

An inverted-type microscope has been described in the above explanation of the first embodiment, but the present invention can be applied to a general erecting-type microscope. The kind, wavelength, number and arrangement of the light sources used at this time may not be the same. The crossing angle between each illumination optical system light path and the observation optical system light path (optical axis 31) does not need to be set at 90 degrees, and the angles may be different from one another Further, the characteristics of the dichroic mirrors used at this time may not be the same, and a dichroic prism or other suitable wavelength classifying means can be applied if it is suitable to desirable luminous flux wavelength characteristics. The mechanism of inserting the dichroic mirror into the optical axis or detaching it therefrom may not be the same as the cube turret CT or the slider SV, and any other mechanism can be used. One of the condense lenses 15 and 16 may be fixed at a predetermined point in an optical axis of the main body of the microscope, without attaching both of the condense lenses 15 and 16 to the slider SV.

2nd Embodiment

Figure 9:
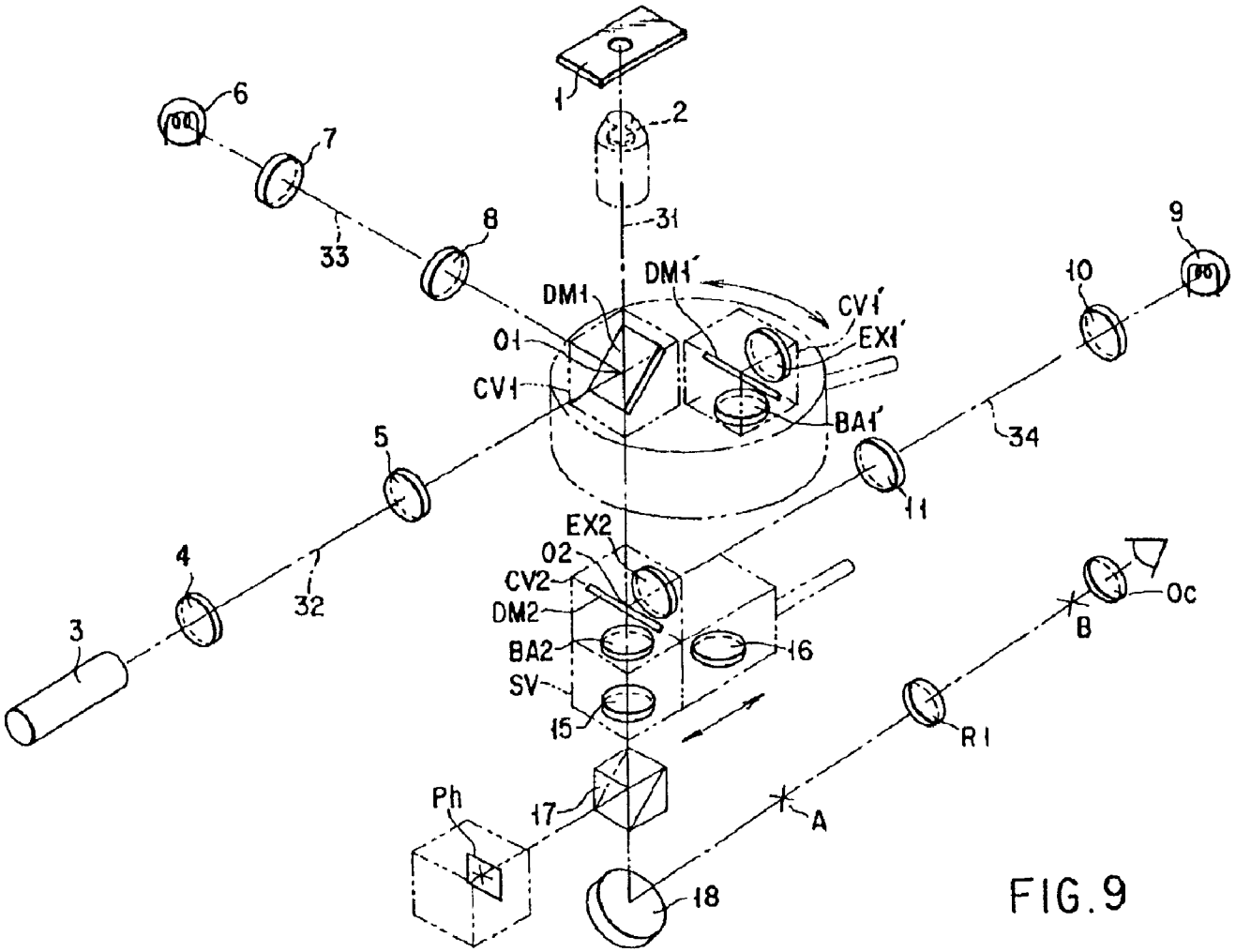
FIG. 9 is a diagram illustrating a schematic structure of a second embodiment of the present invention.

FIG. 9 illustrates a schematic structure of a second embodiment of the present invention, and the same portions as those seen in FIG. 3 are indicated by the same reference numerals.

In the case shown in FIG. 9, the laser light source 12, the collector lens 13, the total reflection mirror 14, the slider SV', the dichroic mirror DM2' and the cube CV2' are removed from the structure of FIG. 3, and the other portions are the same as FIG. 3.

That is, the laser light source 12 and the cube CV2' are removed from the structure of FIG. 3, in the second embodiment thus constituted.

For this reason, if unnecessary optical elements are not inserted in the parallel luminous flux light path of the observation optical system (i.e. between the object lens 2 and the condense lens 16) by switching the slider SV' to insert the condense lens 16 into the optical axis 31, and rotating the turret of the cube turret CT to position the portion including no cubes to the optical axis 31 or detach the cube CV1, the present invention can be switched to a general inverted-type microscope by only simple operations.

With these operations, by removing from the observation light path the dichroic mirrors or barrier filters which are not used in the general fluorescence observation of irradiating only a single excitation light beam, unexpected inconvenience that the fluorescence of the wavelength band in a certain range may be reflected and removed from the observation light path, can be prevented in advance since the unused cube is in the observation light path. In addition, by removing unnecessary optical elements, losing the light amount at observation of the fine fluorescence can be prevented in advance, and deterioration of an observation image obtained by combining the fluorescence observation and the other microscopic method can be prevented.

Figure 10:
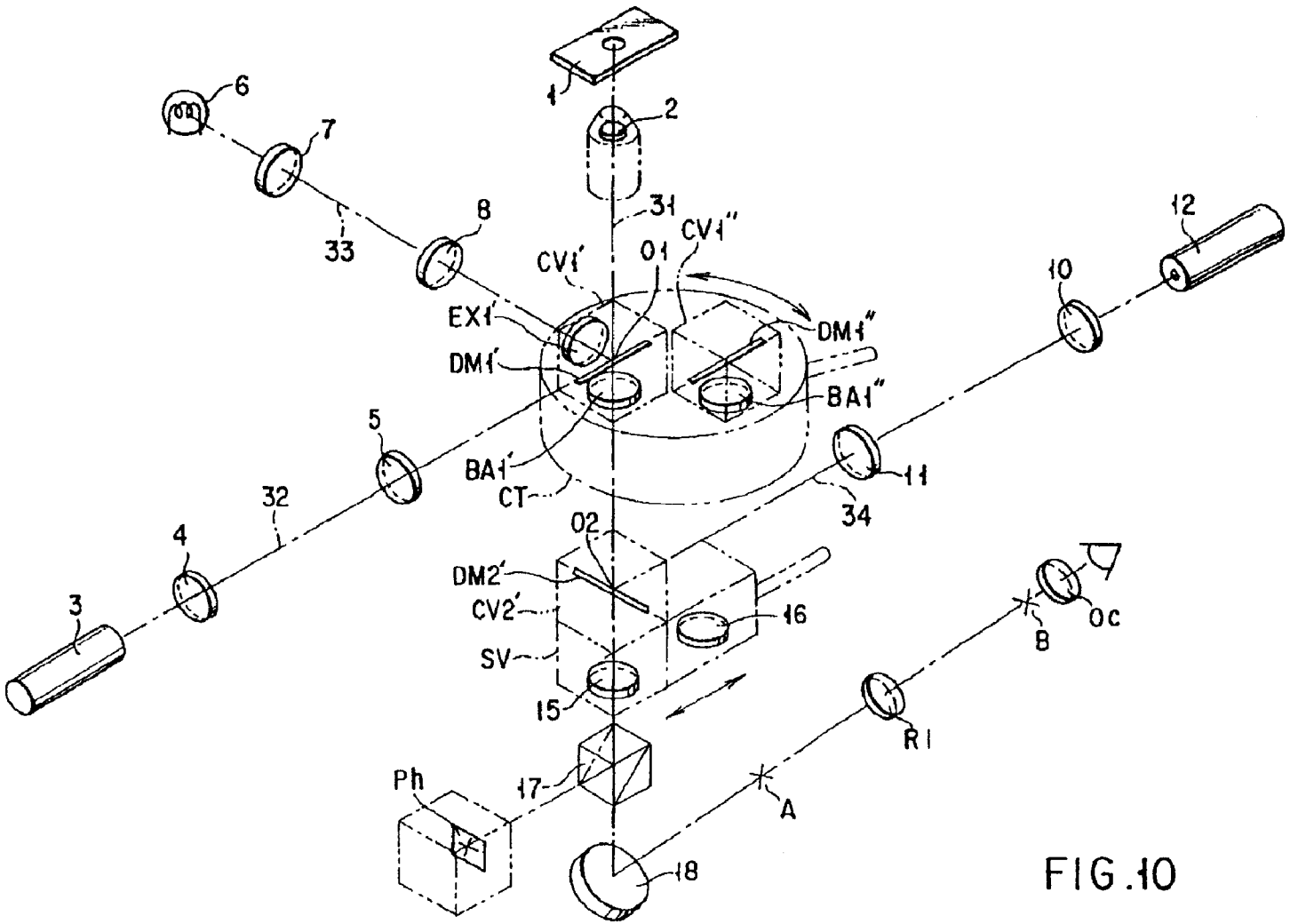
FIG. 10 is a diagram illustrating a partially modified schematic structure of the second embodiment of the present invention.

If the laser trap is employed in the structure shown in FIG. 9, the cube CV2 of the slider SV shown in FIG. 9 may be replaced with the cube CV2' as shown in FIG. 10, and the laser light source 12 may be used instead of the mercury light source 9.

With this structure, the laser trap and the fluorescence observations can be carried out simultaneously, and the same advantage as the above-described one can be expected. In this embodiment, the cube attached to the slider SV may be replaced with the other one in accordance with the light source which is to be used.

An inverted-type microscope has been described in the above explanation of the second embodiment, but the present invention can be applied to a general erecting-type microscope. The kind, wavelength, number and arrangement of the light sources used at this time may not be the same. The crossing angle between each illumination optical system light path and the observation optical system light path (optical axis 31) does not need to be set 90 degrees, and the angles may be different from one another. Further, the characteristics of the dichroic mirrors used at this time may not be the same, and a dichroic prism or other suitable wavelength classifying means can be applied if it is suitable to desirable luminous flux wavelength characteristics. The mechanism of inserting the dichroic mirror into the optical axis or detaching it therefrom may not be the same as the cube turret (T or the slider SV, and any other mechanism can be used. One of the condense lenses 15 and 16 may be fixed at a predetermined point in an optical axis of the main body of the microscopes, without attaching both of the condense lenses 15 and 16 to the slider SV.

3rd Embodiment

Figure 11:
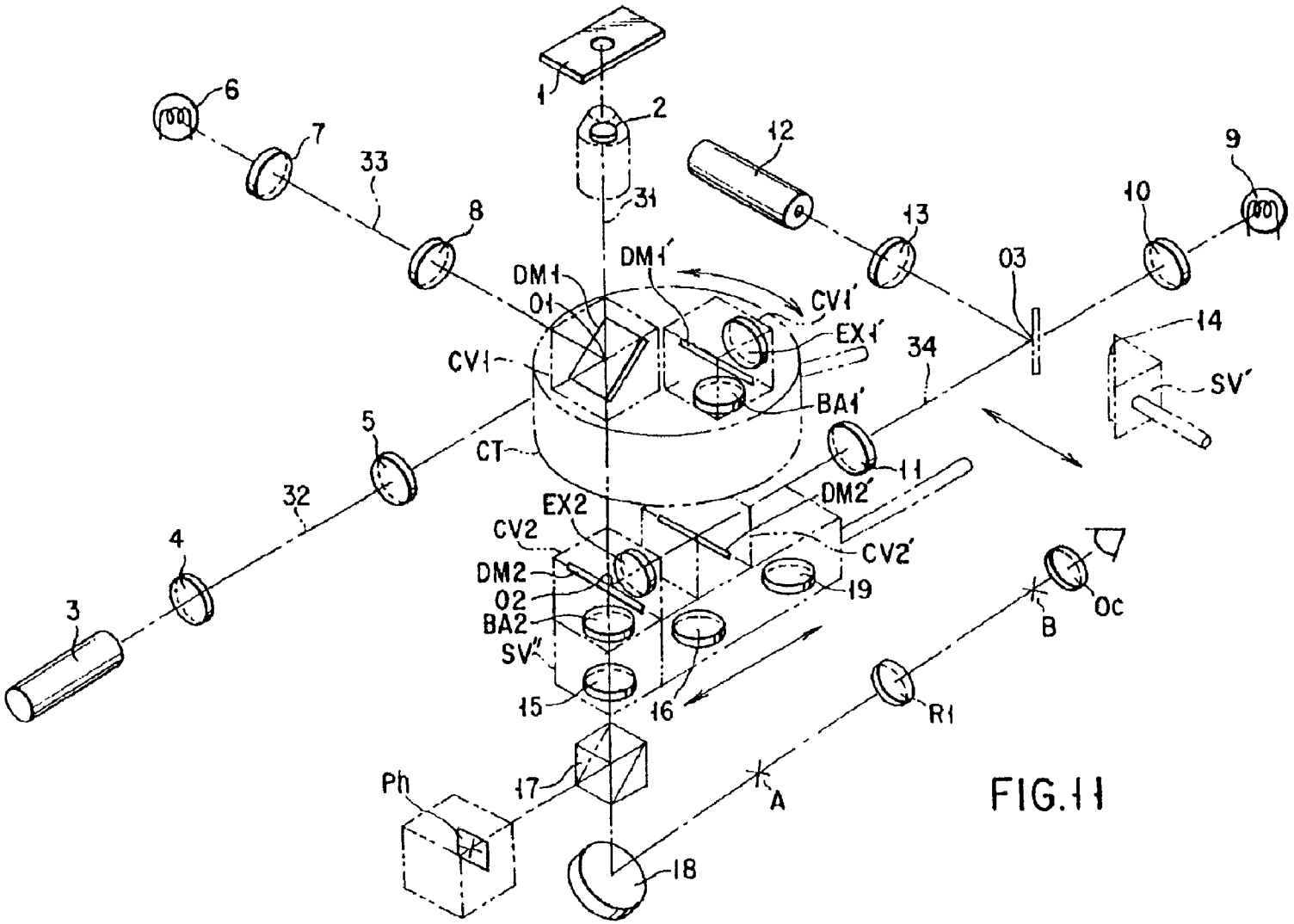
FIG. 11 is a diagram illustrating a schematic structure of a third embodiment of the present invention.

FIG. 11 illustrates a schematic structure of a third embodiment of the present invention, and the same portions as those seen in FIG. 3 are indicated by the same reference numerals.

In the case shown in FIG. 11, a slider SV" newly including a condense lens 19, which is formed by extending the slider SV, is provided instead of the slider SV shown in FIG. 3. The other portions are the same as FIG. 3.

In the third embodiment thus constituted, a positioning mechanism (not shown) allows the cubes CV2 and CV2', and the condense lens 19 to be inserted into the parallel luminous flux light path of the observation optical system by switching the slider SV".

With this operation, the above-described advantage of the second embodiment can be obtained without losing any advantage of the first embodiment. That is, various luminous flux can be selectively used, and an inverted-type microscope which is usable in a general manner can be provided, only by the simple switching.

An inverted-type microscope has been described in the above explanation of the third embodiment, but the present invention can be applied to a general erecting-type microscope. The kind, wavelength, number and arrangement of the light sources used at this time may not be the same. The crossing angle between each illumination optical system light path and the observation optical system light path (optical axis 31) does not need to be set at 90 degrees, and the angles may be different from one another Further, the characteristics of the dichroic mirrors used at this time may not be the same, and a dichroic prism or other suitable wavelength classifying means can be applied if it is suitable to desirable luminous flux wavelength characteristics. The mechanism of inserting the dichroic mirror into the optical axis or detaching it therefrom may not be the same as the cube turret CT or the slider SV, and any other mechanism can be used. One of the condense lenses 15, 16 and 19 may be fixed at a predetermined point in an optical axis of the main body of the microscope, without attaching all of the condense lenses 15, 16 and 19 to the slider SV". The condense lenses 15, 16 and 19 do not need to be attached to the slider SV". For example, one of the condense lenses 15, 16 and 19 may be fixed at a predetermined point in an optical axis of the main body of the microscope, except for the other condense lenses.

4th Embodiment

Figure 12:
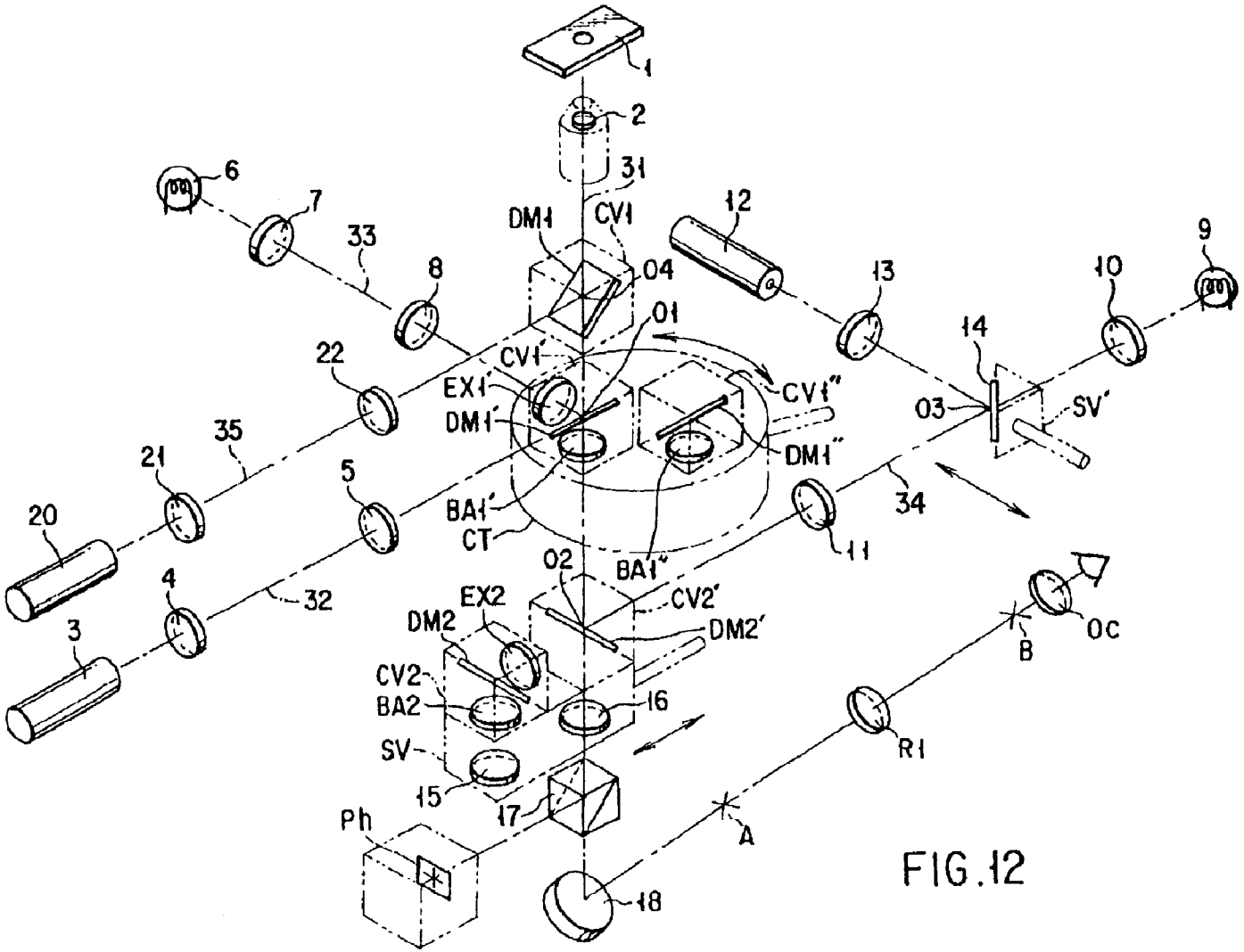
FIG. 12 is a diagram illustrating a schematic structure of a fourth embodiment of the present invention.

FIG. 12 illustrates a schematic structure of a fourth embodiment of the present invention, and the same portions as those seen in FIG. 3 are indicated by the same reference numerals.

In the case shown in FIG. 12, a point 04 is set in the optical axis 31 of the observation optical system light path, between the object lens 2 and the point O1 in the structure of FIG. 4, the cube CV1 including the dichoric mirror DM1 is provided so that the point 04 can be a reflection point of the optical axis, and the relay lens 22, collector lens 21 and laser light source 20 are provided in a common straight line in an optical axis 35 of the fourth reflected illumination optical system light path reflected by the dichroic mirror DM1. The other portions of are the same as FIG. 4.

In the fourth embodiment thus constituted , if an $N_2$ laser light source having a wavelength of 337 nm for the Caged reagent release as the laser light source 20, the laser light oscillation by the laser light source 20 is reflected upward by the characteristics of the dichroic mirror DM1 after passing through the collector lens 12 and the relay lens 22, and illuminates a predetermined position in the observation visual field of the sample 1.

With this structure, the Caged reagent release can be added to the fluorescence observation and the laser trap, and three light sources can be used simultaneously by taking advantage of the characteristics of the wavelength of each optical element described in the first embodiment.

With these operations, it is possible to irradiate the excitation light, irradiate the $N_2$ laser beam onto arbitrary protein in cells while observing the fluorescence inside cells to release the Caged reagent, irradiate the IR laser onto the activated protein and optically capture it, and measure a tiny force, which is very effective in the cell physiological field analyzing the movement of intracellular substances at the molecular level. That is, various light sources need often to be used simultaneously in pursuit in such a technical field, but the present invention can provide an apparatus having large academic merits developed above, with the structure shown in FIG. 12.

In the fourth embodiment, the dichroic mirror DM2' for the laser strip is provided to be the lowermost one, of the dichroic mirrors in the other optical axis, but may be provided at any position. In addition, dichroic mirrors in the optical axes can be increased. The cube CV1 is provided as a single cube, but a plurality of cubes can be inserted or detached at the position of the cube CV1 by any mechanism.

An inverted-type microscope has been described in the above explanation of the fourth embodiment, but the present invention can be applied to a general erecting-type microscope. The kind, wavelength, number and arrangement of the light sources used at this time may not be the same. The crossing angle between each illumination optical system light path and the observation optical system light path (optical axis 31) does not need to be set at 90 degrees, and the angles may be different from one another. Further, the characteristics of the dichroic mirrors used at this time may not be in the same, and a dichroic prism or other suitable wavelength classifying means can be applied if it is suitable to desirable luminous flux wavelength characteristics. The mechanism of inserting the dichroic mirror into the optical axis or detaching it therefrom may not be the same as the cube turret CT or the slider SV, and any other mechanism can be used. One of the condense lenses 15 and 16 may be fixed at a predetermined point in an optical axis of the main body of the microscope, without attaching both of the condense lenses 15 and 16 to the slider SV.

5th Embodiment

Each of the embodiments can be applied to an erecting-type microscope as described above. An embodiment of the present invention constituted with an erecting-type microscope will be described now with reference to FIG. 13.

Figure 13:
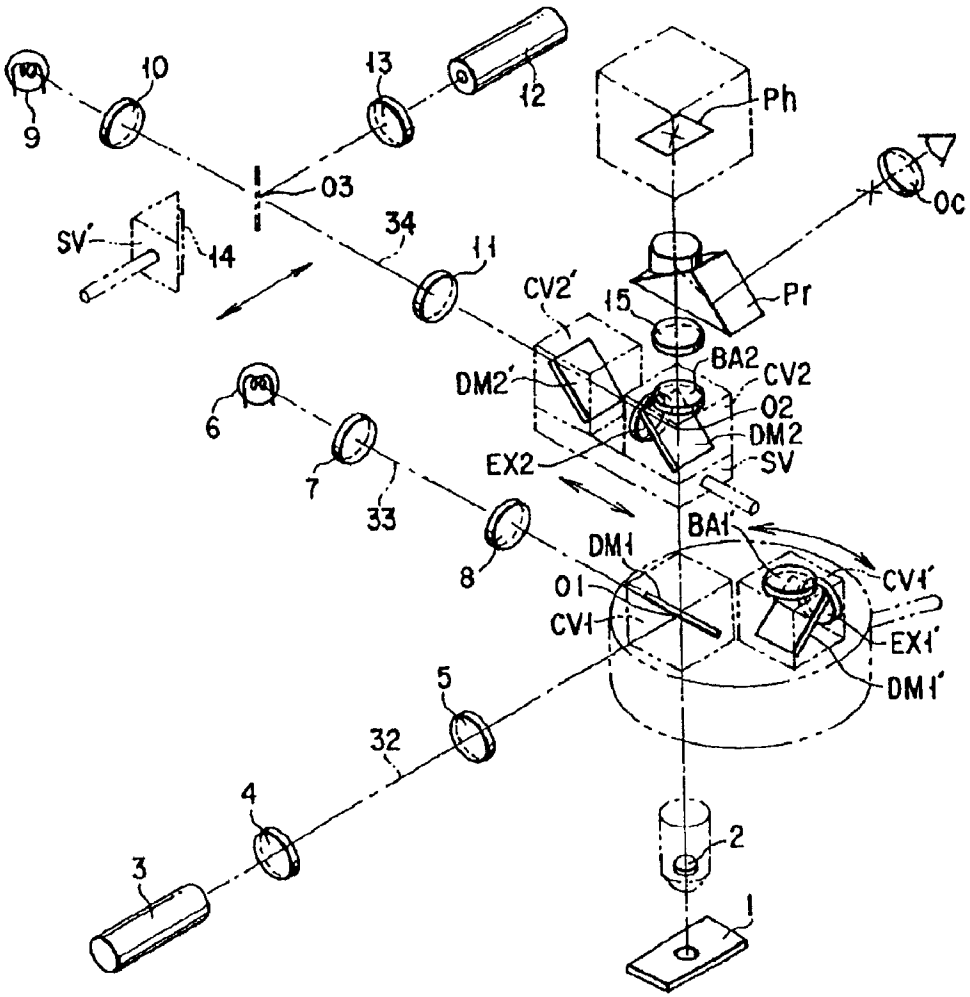
FIG. 13 is a diagram illustrating a schematic structure of a firth embodiment of the present invention.

FIG. 13 illuminates a schematic structure of an embodiment of the present invention constituted with an erecting-type microscope. In the figure, reference numeral 1 denotes a sample to be observed, and a reflected illumination and observation optical system including an object lens is provided over the sample.

The reference symbols attached to the constituent elements of the related illumination optical system between the object lens 2 and the condense lens 15 correspond to the reference symbols of the constituent elements shown in FIG. 3. That is, the reflected illuminates optical system of the inverted-type microscope of FIG. 3 described in the first embodiment is reversed in FIG. 13.

A light path splitting prism Pr is provided over the condense lens 15. The observation light transmitted through the light path splitting prism Pr forms an image on the photographing surface Ph of a photographing apparatus, a TV camera, etc. On the other hand, the observation light reflected at the light path splitting prism Pr forms an image before an eyepiece Oc so that the image can be visually observed through the eyepiece Oc.

The operations of the embodiment thus constituted are quite the same as those described in the first embodiment. That is, the same advantage can be also obtained from an erecting-type microscope.

As described in detail, the present invention can provide a reflected fluorescence microscope rich in usability in a general purpose, having a plurality of independent light paths of the reflected illumination optical system, wherein the use of each reflected illumination light path is not limited by selecting the reflected illumination light paths and combining the laser light sources for the Caged reagent release, mercury lamps for excitation light illumination, the laser light sources for the laser trap, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflected fluorescence microscope for allowing a plurality of reflected illumination light beams to be selectively irradiated onto a sample, to carry out optical operations of said sample and its fluorescence observation simultaneously, said microscope comprising:

a first reflected illumination optical system light path provided in a direction which crosses an observation optical system light path to said sample at a point of intersection;

a second reflected illumination optical system light path provided in a direction which crosses said observation optical system light path at the same point of intersection as that between said observation optical system light path and said first reflected illumination optical system light path;

a first movable member having a cube including a first dichroic mirror and a cube including a second dichroic mirror, for providing a desired one of said cubes to be inserted or detached at said point of intersection between and observation optical system light path and said first or second reflected illumination optical system light path;

a third reflected illumination optical system light path provided in a direction which crosses said observation optical system light path at a different point of intersection from that between said first or second reflected illumination optical system light path; and a second movable member having a cube including a third dichroic mirror, for providing said cube with said third dichroic mirror to be inserted or detached at said point of intersection between said observation optical system light path and said third reflected illumination optical system light path, wherein said first dichroic mirror reflects the light from said first reflected illumination optical system light path to a side of said sample, while transmitting fluorescence emitted from said sample.

2. A microscope according to claim 1, wherein said second dichroic mirror reflects the light from said second reflected illumination optical system light path to a side of said sample, while transmitting fluorescence emitted from said sample.

3. A microscope according to claim 2, wherein said third dichroic mirror reflects the light from said third reflected illumination optical system light path to a side of said sample, while transmitting fluorescence emitted from said sample.

4. A microscope according to claim 1, wherein said first movable member comprises a cube turret.

5. A microscope according to claim 1, wherein said second movable member comprises a slider.

6. A microscope according to claim 1, further comprising a laser light source which forms said first reflected illumination optical system light path.

7. A microscope according to claim 6, further comprising a mercury light source which forms said second reflected illumination optical system light path.

8. A microscope according to claim 7, further comprising at least one of a laser light source and a mercury light source which forms said third reflected illumination optical system light path.

9. A reflected fluorescence microscope for allowing a plurality of reflected illumination light beams to be selectively irradiated onto a sample, to carry out optical operations of said sample and its fluorescence observation simultaneously, said microscope comprising:

a first reflected illumination optical system light path provided in a direction which crosses an observation optical system light path to said sample at a point of intersection;

a second reflected illumination optical system light path provided in a direction which crosses said observation optical system light path at the same point of intersection as that between said observation optical system light path and said first reflected illumination optical system light path;

a first movable member having a cube including a first dichroic mirror and a cube including a second dichroic mirror, for providing a desired one of said cubes to be inserted or detached at said point of intersection between said observation optical system light path and said first or second reflected illumination optical system light path;

a third reflected illumination optical system light path provided in a direction which crosses said observation optical system light path at a different point of intersection from that between said first or second reflected illumination optical system light path;

a second movable member having a cube including a third dichroic mirror, for providing said cube with said third dichroic mirror to be inserted or detached at said point of intersection between said observation optical system light path and said third reflected illumination optical system light path; and a fourth reflected illumination optical system light path provided in a direction which crosses said third reflected illumination optical system light path at a point of intersection.

10. A microscope according to claim 9, further comprising a slider for providing a total reflection mirror to be inserted or detached at a point of intersection between said third and fourth reflected illumination optical system light paths.

11. A reflected fluorescence microscope for allowing a plurality of reflected illumination light beams to be selectively irradiated onto a sample, [to carry] *and carrying* out optical operations of said sample and its fluorescence observation simultaneously, said microscope comprising:

an observation optical system light path which passes through an objective lens from the sample to an image forming element for forming an image of the sample:

a first reflected illumination optical system light path which crosses said observation optical system light [oath] *path* at a point of intersection; and a second reflected illumination optical system light path which crosses said observation optical system light path at [the same] *said* point of intersection [as that between said observation optical system light path and] *in a different direction from* said first reflected illumination optical system light path, wherein said first reflected illumination optical system light path and said second reflected illumination optical system light path transmit illumination light beams differing in spectral distributions.

12. A microscope according to claim 11, further comprising:

a light path splitting member provided at a point on said observation optical system light path between said objective lens and said image forming element, and which splits light into split light paths; and an eyepiece provided at a point on a light path which is one of the split light paths split by said light path splitting member.

13. A microscope according to claim 11, further comprising a third related illumination optical system light path which crosses said observation optical system light path at a different point of intersection from that of said first or second reflected illumination optical system light path.

14. A microscope according to claim 13, further comprising wavelength discriminating means provided to be inserted or detected at said point of intersection between said observation optical system light path and said third reflected illumination optical system light path.

15. A microscope according to claim 13, further comprising a fourth reflected illumination optical system light path which crosses said observation optical system light path at a different point of intersection from that of said first, second or third reflected illumination optical system light path.

16. A microscope according to claim 13, further comprising a slider having a cube including a dichroic mirror, for providing said cube to be inserted or detached at said point of intersection between said observation optical system light path and said third reflected illumination optical system light path.

17. A microscope according to claim 13, further comprising at least one of a laser light source and a mercury light source which forms said third reflected illumination optical system light path.

18. A microscope according to claim 11, further comprising a cube turret having a cube including a first dichroic mirror and a cube including a second dichroic mirror, for providing a desired one of said cubes to be inserted or detached of said point of intersection between said observation optical system light path and said first or second reflected illumination optical system light path.

19. A microscope according to claim 11, further comprising a laser light source which forms said first reflected illumination optical system light path.

20. A microscope according to claim 19, further comprising a mercury light source which forms said second reflected illumination optical system light path.

*21. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical system light path which is formed by a first light source and which crosses said observation optical system light path at a first point of intersection;*

*a second reflected illumination optical system light path which is formed by a second light source and which crosses said observation optical system light path at a second point of intersection different from the first point of intersection, the second point of intersection being located between said objective lens and the first point of intersection; and*

*means for inhibiting and allowing transmission of a light beam from the second light source of said second reflected illumination to said observation optical system light path;*

*wherein a wavelength of a light beam from the first light source of said first reflected illumination optical system light path is longer than a wavelength of a light beam from the second light source of said second reflected illumination optical system.*

*22. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical system light path which is formed by a first light source and which crosses said observation optical system light path at a first point of intersection;*

*a second reflected illumination optical system light path which is formed by a second light source and which crosses said observation optical system light path at a second point of intersection different from the first point of intersection, the second point of intersection being located between said objective lens and the first point of intersection; and*

*means for inhibiting and allowing transmission of a light beam from the second light source of said second reflected illumination to said observation optical system light path;*

*wherein said means for inhibiting and allowing transmission of a light beam from the second light source comprises a cube which includes a dichroic mirror and which is capable of being inserted to and detached from said observation optical system light path at the second point of intersection.*

*23. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical sample light path which is formed by a first light source and which crosses said observation optical system light path at a first point of intersection;*

*a second reflected illumination optical system light path which is formed by a second light source and which crosses said observation optical system light path at a second point of intersection different from the first point of intersection, the second point of intersection being located between said objective lens and the first point of intersection; and*

*means for inhibiting and allowing transmission of a light beam from the second light source of said second reflected illumination to said observation optical system light path;*

*wherein said means for inhibiting and allowing transmission of a light beam from the second light source comprises a plurality of cubes, each of which is capable of being inserted to and detached from said observation optical system light path at the second point of intersection.*

*24. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical system light path which is formed by a first light source and which crosses said observation optical system light path at a first point of intersection;*

*a section reflected illumination optical system light path which is formed by a second light source and which crosses said observation optical system light path at a second point of intersection different from the first point of intersection, the second point of intersection being located between said objective lens and the first point of intersection;*

*means for inhibiting and allowing transmission of a light beam from the second light source of said second reflected illumination to said observation optical system light path; and*

*a slider having a cube including a dichroic mirror, and wherein said slider is adapted to insert and remove said cube from said observation optical system light path at the first point of intersection.*

*25. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical system light path which is formed by a first light source and which crosses said observation optical system light path at a first point of intersection;*

*a second reflected illumination optical system light path which is formed by a second light source and which crosses said observation optical system light path at a second point of intersection different from the first point of intersection, the second point of intersection being located between said objective lens and the first point of intersection; and*

*means for inhibiting and allowing transmission of a light beam from the second light source of said second reflected illumination to said observation optical system light path;*

*wherein said second light source includes at least one of a laser light source and a mercury light source which forms said first reflected illumination optical system light path; and*

*wherein said second light source produces an $N_2$ laser having a wavelength at 337 nm.*

*26. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical system light path which is formed by a first light source and which crosses said observation optical system light path at a first point of intersection;*

*a second reflected illumination optical system light path which is formed by a second light source and which crosses said observation optical system light path at a second point of intersection different from the first point of intersection, the second point of intersection being located between said objective lens and the first point of intersection; and*

*means for inhibiting and allowing transmission of a light beam from the second light source of said second reflected illumination to said observation optical system light path;*

*wherein a wavelength of a light beam from the first light source of said first reflected illumination optical system light path is different from a wavelength of a light beam from the second light source of said second reflected illumination optical system.*

*27. A reflected fluorescence microscope for allowing a plurality of reflected illumination light beams to be selectively irradiated onto a sample, and carrying out optical operations of said sample and its fluorescence observation simultaneously, said microscope comprising:*

*an observation optical system light path which passes through an objective lens from the sample to an image forming element for forming an image of the sample;*

*a first reflected illumination optical system light path which is formed by a first light source and which crosses said observation optical system light path at a first point of intersection;*

*a second reflected illumination optical system light path which is formed by a second light source and which crosses said observation optical system light path at a second point of intersection different from the first point of intersection, the second point of intersection being located between said objective lens and the first point of intersection; and*

*means for inhibiting and allowing transmission of a light beam from the second light source of said second reflected illumination to said observation optical system light path;*

*wherein said means for inhibiting and allowing transmission of a light beam from the second light source comprises a cube which includes a dichroic mirror and which is capable of being inserted to and detached from said observation optical system light path at the second point of intersection.*

*28. A microscope according to claim 27, wherein a wavelength of a light beam from the first light source of said first reflected illumination optical system light path is different from a wavelength of a light beam from the second light source of said second reflected illumination optical system.*

*29. A microscope according to claim 27, wherein a wavelength of a light beam from the first light source of said first reflected illumination optical system light path is longer than a wavelength of a light beam from the second light source of said second reflected illumination optical system.*

*30. A microscope according to claim 27, wherein said means for inhibiting and allowing transmission of a light beam from the second light source comprises a plurality of cubes, each of which is capable of being inserted to and detached from said observation optical system light path at the second point of intersection.*

*31. A microscope according to claim 27, further comprising a light path splitting member which is provided at a point on said observation optical system light path between said objective lens and said image forming element, and which splits light into two split light paths.*

*32. A microscope according to claim 27, further comprising a slider having a cube including a dichroic mirror, and wherein said slider is adapted to insert and remove said cube from said observation optical system light path at the first point of intersection.*

*33. A microscope according to claim 27, wherein said second light source includes at least one of a laser light source and a mercury light source which forms said first reflected illumination optical system light path.*

*34. A microscope according to claim 33, wherein said second light source produces an $N_2$ laser having a wavelength of 337 nm.*

* * * * *